United States Patent
Jahnke

(10) Patent No.: US 10,608,272 B2
(45) Date of Patent: Mar. 31, 2020

(54) SYSTEM FOR CAPTURING CO2 FROM A FUEL CELL

(71) Applicant: FuelCell Energy, Inc., Danbury, CT (US)

(72) Inventor: Fred C. Jahnke, Rye, NY (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 15/980,301

(22) Filed: May 15, 2018

(65) Prior Publication Data

US 2018/0261865 A1    Sep. 13, 2018

Related U.S. Application Data

(63) Continuation of application No. PCT/US2016/062069, filed on Nov. 15, 2016.
(Continued)

(51) Int. Cl.
*H01M 8/00* (2016.01)
*H01M 8/0668* (2016.01)
(Continued)

(52) U.S. Cl.
CPC ........ *H01M 8/0668* (2013.01); *B01D 53/326* (2013.01); *B01D 53/62* (2013.01); *C01B 3/48* (2013.01); *C25B 1/02* (2013.01); *C25B 1/04* (2013.01); *C25B 9/06* (2013.01); *C25B 15/08* (2013.01); *H01M 8/0637* (2013.01); *H01M 8/0681* (2013.01); *B01D 2256/22* (2013.01); *B01D 2258/0208* (2013.01);
(Continued)

(58) Field of Classification Search
CPC ...... C01B 2203/1241; C01B 2203/041; C01B 2203/0283; C01B 3/48; Y02P 20/152; H01M 8/0681; H01M 8/0637
See application file for complete search history.

(56) References Cited

U.S. PATENT DOCUMENTS 3,094,390 A    6/1963    Vander
4,849,091 A    7/1989    Cabrera et al.
(Continued)

FOREIGN PATENT DOCUMENTS

CA    1242985 A    8/1985
CA    2937948 A    8/2015
(Continued)

OTHER PUBLICATIONS

International Search Report and Written Opinion in PCT/IB2018/059191 dated Mar. 27, 2019 (20 pages).
(Continued)

*Primary Examiner* — Cynthia H Kelly
*Assistant Examiner* — Monique M Wills
(74) *Attorney, Agent, or Firm* — Foley & Lardner LLP

(57) ABSTRACT

A carbon dioxide capture system for capturing carbon dioxide from an exhaust stream. The system may include a fuel cell configured to output a first exhaust stream comprising carbon dioxide and water. The system may further include an electrolyzer cell configured to receive a first portion of the first exhaust stream and output a second exhaust stream comprising oxygen and carbon dioxide. The fuel cell may be a solid oxide fuel cell. The electrolyzer cell may be a molten carbonate electrolysis cell.

13 Claims, 3 Drawing Sheets

Related U.S. Application Data

(60) Provisional application No. 62/255,835, filed on Nov. 16, 2015.

(51) Int. Cl.
*C25B 9/06* (2006.01)
*H01M 8/0637* (2016.01)
*B01D 53/62* (2006.01)
*C25B 15/08* (2006.01)
*B01D 53/32* (2006.01)
*C25B 1/04* (2006.01)
*C01B 3/48* (2006.01)
*C25B 1/02* (2006.01)
*H01M 8/0662* (2016.01)
*H01M 8/124* (2016.01)

(52) U.S. Cl.
CPC ............... *C01B 2203/0233* (2013.01); *C01B 2203/0283* (2013.01); *C01B 2203/041* (2013.01); *C01B 2203/067* (2013.01); *C01B 2203/1241* (2013.01); *C01B 2203/84* (2013.01); *H01M 2008/1293* (2013.01); *Y02C 10/04* (2013.01); *Y02E 60/366* (2013.01); *Y02E 60/566* (2013.01); *Y02P 20/152* (2015.11)

(56) References Cited

U.S. PATENT DOCUMENTS

| | | |
|---|---|---|
| 5,071,719 A | 12/1991 | Rostrup-Nielsen et al. |
| 5,346,613 A | 9/1994 | Lomas et al. |
| 5,413,878 A | 5/1995 | Williams et al. |
| 5,711,770 A | 1/1998 | Malina |
| 6,187,465 B1 | 2/2001 | Galloway |
| 7,070,874 B2 | 7/2006 | Blanchet et al. |
| 7,323,270 B2 | 1/2008 | Patel et al. |
| 7,353,085 B2 | 4/2008 | Rusta-Sallehy et al. |
| 7,396,603 B2 | 7/2008 | Farooque et al. |
| 9,478,819 B2 | 10/2016 | Lambrech et al. |
| 2002/0004154 A1 | 1/2002 | Pastula et al. |
| 2004/0180249 A1 | 9/2004 | Pham et al. |
| 2005/0058863 A1 | 3/2005 | Wang et al. |
| 2005/0112425 A1 | 5/2005 | Hsu |
| 2005/0123810 A1 | 6/2005 | Balan |
| 2005/0197743 A1 | 9/2005 | Rusta-Sallehy et al. |
| 2005/0271914 A1 | 12/2005 | Farooque et al. |
| 2006/0140823 A1 | 6/2006 | Katikaneni et al. |
| 2006/0248800 A1 | 11/2006 | Miglin et al. |
| 2008/0060935 A1 | 3/2008 | Hartvigsen |
| 2008/0075990 A1 | 3/2008 | Isozaki et al. |
| 2008/0155984 A1 | 7/2008 | Liu et al. |
| 2008/0314741 A1 | 12/2008 | Balestrino et al. |
| 2009/0110989 A1 | 4/2009 | Daly et al. |
| 2009/0158662 A1 | 6/2009 | Towler |
| 2009/0226775 A1 | 9/2009 | Jahnke et al. |
| 2009/0235587 A1 | 9/2009 | Hawkes et al. |
| 2010/0047641 A1 | 2/2010 | Jahnke et al. |
| 2010/0304228 A1 | 12/2010 | Majarov et al. |
| 2011/0104577 A1 | 5/2011 | Cui et al. |
| 2011/0189567 A1 | 8/2011 | Venkataraman et al. |
| 2013/0052548 A1 | 2/2013 | Nedergaard Clausen et al. |
| 2013/0108936 A1* | 5/2013 | McElroy ............ H01M 8/0668 429/410 |
| 2013/0126038 A1 | 5/2013 | Jamal et al. |
| 2013/0177824 A1 | 7/2013 | Cui et al. |
| 2013/0251598 A1 | 9/2013 | Gil et al. |
| 2013/0260268 A1 | 10/2013 | Shapiro et al. |
| 2014/0076213 A1 | 3/2014 | Ingram et al. |
| 2014/0080076 A1 | 3/2014 | Lutz |
| 2014/0093798 A1 | 4/2014 | Snyder et al. |
| 2014/0272626 A1 | 9/2014 | Berlowitz et al. |
| 2014/0272629 A1 | 9/2014 | Berlowitz et al. |
| 2015/0280265 A1 | 10/2015 | McLarty |
| 2016/0344045 A1 | 11/2016 | Ishino et al. |
| 2016/0351930 A1 | 12/2016 | Jahnke et al. |

FOREIGN PATENT DOCUMENTS

| | | |
|---|---|---|
| CN | 101427408 A | 5/2009 |
| CN | 104847424 A | 8/2015 |
| CN | 106133973 A | 11/2016 |
| DE | 10 2012 206 541 A1 | 10/2013 |
| EP | 2 784 187 A1 | 10/2014 |
| EP | 3 054 519 A1 | 8/2016 |
| JP | 51-008405 A | 1/1976 |
| JP | 60-235893 | 11/1985 |
| JP | 06-005301 A | 1/1994 |
| JP | 11-169661 A | 6/1999 |
| JP | 11-223475 A | 8/1999 |
| JP | 2002-319428 | 10/2002 |
| JP | 2004-099927 A | 4/2004 |
| JP | 2004-311159 A | 11/2004 |
| JP | 2007-162531 | 6/2007 |
| JP | 2007-523443 | 8/2007 |
| JP | 2008-507113 | 3/2008 |
| JP | 2009-517547 | 4/2009 |
| JP | 2010-013333 A | 1/2010 |
| JP | 2010-518559 A | 5/2010 |
| JP | 2010-129286 | 6/2010 |
| JP | 2010-212141 A | 9/2010 |
| JP | 2010-228963 | 10/2010 |
| JP | 2012-514039 | 6/2012 |
| JP | 2014-198789 | 10/2014 |
| JP | 2005-293934 A | 10/2015 |
| JP | 6096790 B2 | 3/2017 |
| JP | 2017-511956 | 4/2017 |
| KR | 1020070057131 A | 6/2007 |
| KR | 20110114816 | 10/2011 |
| KR | 1020160114632 A | 10/2016 |
| WO | WO-01/04045 | 1/2001 |
| WO | WO-2007/015689 A2 | 2/2007 |
| WO | WO-2009/031747 A1 | 3/2009 |
| WO | WO-2013/029701 A1 | 3/2013 |
| WO | WO-2015/116964 A1 | 8/2015 |
| WO | WO-2017/087405 A1 | 5/2017 |

OTHER PUBLICATIONS

Caprile et al.; Carbon capture: Energy wasting technologies or the MCFCs challenge? International Journal of Hydrogen Energy; 2011; 36:10269-77.

Desideri et al.; MCFC-based CO2 capture system for small scale CHP plants. International Journal of Hydrogen Energy. 2012;37: 19295-303.

Extended European Search Report dated Oct. 26, 2018 for EP18182210.7 (8 pages).

Extended European Search Report in EP 15744017.3 dated Aug. 16, 2017 (12 pages).

Heidenbrecht et al., Molten Carbonate Fuel Cell (MCFC) with Internal Reforming: model-based analysis of cell dynamics, Chemical Engineering Science, vol. 58, issues 3-6, 2003, pp. 1029-1036.

International Search Report and Written Opinion dated May, 6, 2014 in PCT/US2015/013837 (13 pages).

International Search Report and Written Opinion dated Jul. 19, 2017 for PCT/US17/28321 (16 pages).

International Search Report and Written Opinion dated Jul. 26, 2017 in PCT/US17/30230 (13 pages).

International Search Report and Written Opinion for PCT/US16/61981 dated Jan. 19, 2017 (8 pages).

International Search Report and Written Opinion in PCT/US/16/62276, dated Jan. 31, 2017 (8 pages).

International Search Report and Written Opinion in PCT/US16/62069 dated Jan. 27, 2017 (10 pages).

International Search Report and Written Opinion on PCT/US16/62083, dated Jan. 31, 2017, 8 pages.

Kasai, "CO2 Electrochemical Separation by Molten Carbonate Technology," Fuel Chemistry Division Preprints, 2002, 47(1), 69-70.

(56) References Cited

OTHER PUBLICATIONS

Non-Final Office Action on U.S. Appl. No. 15/115,186 dated Dec. 31, 2018 (7 pages).
Notice of Preliminary Rejection for KR App. No. 10-2018-7016035 dated Nov. 12, 2018, with English translation (14 pages).
Notice of Preliminary Rejection for KR Appl. No. 10-2018-7017810 dated Nov. 12, 2018, with English translation (13 pages).
Notice of Preliminary Rejection for KR Appl. No. 10-2018-7017811 dated Nov. 12, 2018, with English translation (13 pages).
Notification of the First Office Action for CN201580009634.6 dated May 4, 2018, with English translation (15 pages).
Office Action for KR 10-2018-7016036 dated Nov. 12, 2018, with English translation (13 pages).
Office Action in JP 2018-116336 dated Sep. 21, 2018, with English translation (7 pages).
Office Action in JP 2018-525361 dated Sep. 21, 2018, with English translation (6 pages).
Office Action issued in JP 2016-549225, dated Sep. 25, 2017, with English translation (9 pages).
Office Action received in JP 2018-133381 dated Dec. 10, 2018, with English translation (8 pages).
Office Action received in JP 2018-133362 dated Dec. 7, 2018, with English translation (6 pages).
Office Action received in JP 2018-525359 dated Dec. 10, 2018, no English translation available (4 pages ).
Second Office Action issued in CA2937948 dated Jun. 11, 2018 (4 pages).
Extended European Search Report received in EP18182124.0 dated Dec. 7, 2018 (6 pages).
International Search Report and Written Opinion in PCT/IB2018/058968 dated Jan. 23, 2019 (16 pages).
Notice of Allowance on U.S. Appl. No. 15/980,305 dated Feb. 14, 2019.
Non-Final Office Action on U.S. App. No. 15/815,556 dated Oct. 28, 2019.
Notice of Allowance on U.S. Appl. No. 15/980,356 dated Sep. 24, 2019.
Extended European Search Report in EP16867038.8 dated Jun. 27, 2019 (8 pages).
Extended European Search Report in EP16866931 dated May 2, 2019 (10 pages).
Extended European Search Report on EP16866959.6 dated May 3, 2019 (10 pages).
Extended European Search Report received in EP16866965.3, dated Jun. 17, 2019 (7 pages).
International Search Report and Written Opinion in PCT/IB2018/059191 dated Mar. 27, 2019 (20 pages).
Manuel, B. et al., Power to Gas-biomass oxycombustion hybrid system: Energy integration and potential applications, Applied Energy, Elsevier Science Publishers, GB, vol. 167, Oct. 16, 2015, pp. 221-229.
Office Action in JP2018-116336 dated Mar. 26, 2019 with English translation (8 pages).
Office Action in JP2018-525557 dated May 24, 2019, with English translation (14 pages).
Second Office Action in JP2018-525361 dated Mar. 26, 2019.
Third Office Action in JP 2018-116336 dated Dec. 20, 2019, with English translation (9 pages).

* cited by examiner

| Stream No. | 1 | | | 2 | | | 3 SOFC AE to REP | | | 4 REP H2 | | | 5 CO2 | | | 5a CO2 (Dry) | | | 6 Air Exhaust | | |
|---|---|---|---|---|---|---|---|---|---|---|---|---|---|---|---|---|---|---|---|---|---|
| 308 Name | HC Feed | | | Air | | | | | | | | | | | | | | | | | |
| Molar flow lbmol/hr | 1.71 | | | 35.66 | | | 1.92 | | | 1.00 | | | 3.92 | | | 1.77 | | | 32.73 | | |
| Mass flow lb/hr | 29.8 | | | 1,024.9 | | | 45.7 | | | 3.2 | | | 116.2 | | | 77.6 | | | 930.8 | | |
| Temp F | 73° | | | 70° | | | 900° | | | 350° | | | 200° | | | 200° | | | 150° | | |
| Pres psia | 60.00 | | | 14.70 | | | 25.27 | | | 27.00 | | | 50.00 | | | 50.00 | | | 15.34 | | |
| IWCg | 1,253.95 | | | 0.00 | | | 292.62 | | | 340.54 | | | 977.18 | | | 977.16 | | | 17.76 | | |
| Enth MMBtu/hr | -0.058 | | | -0.039 | | | -0.187 | | | -0.004 | | | -0.545 | | | -0.295 | | | -0.031 | | |
| Vapor mole fraction | 1.000 | | | 1.000 | | | 1.000 | | | 1.000 | | | 0.588 | | | 1.000 | | | 1.000 | | |
| SCFM | 10.82 | | | 225.54 | | | 12.14 | | | 6.30 | | | 24.77 | | | 11.20 | | | 207.02 | | |
| Average mol wt | 17.41 | | | 28.74 | | | 23.81 | | | 3.25 | | | 29.67 | | | 43.80 | | | 28.44 | | |
| Actual dens lb/ft3 | 0.1843 | | | 0.0743 | | | 0.0413 | | | 0.0101 | | | 0.3605 | | | 0.3119 | | | 0.0667 | | |
| Actual vol ft3/min | 2.69 | | | 229.92 | | | 18.47 | | | 5.34 | | | 5.37 | | | 4.14 | | | 232.69 | | |
| Cp Btu/lbmol-F | 8.90 | | | 6.99 | | | 9.57 | | | 7.13 | | | 18.11 / 9.53 | | | 9.74 | | | 7.00 | | |
| Cp/Cv | 1.383 | | | 1.400 | | | 1.263 | | | 1.386 | | | 1.26733 Vap | | | 1.271 | | | 1.398 | | |
| Z factor | 0.9917 | | | 0.9997 | | | 0.9997 | | | 1.0007 | | | 0.9877 Vap / 0.3029 / | | | 0.9919 | | | 1.0001 | | |
| Visc cP | 0.0111 | | | 0.0180 | | | 0.0308 | | | 0.0135 | | | 0.01717 | | | 0.0181 | | | 0.0199 | | |
| Th cond Btu/hr-ft-F | 0.0188 | | | 0.0146 | | | 0.0472 | | | 0.1221 | | | 0.3886 / 0.0132 | | | 0.0129 | | | 0.0184 | | |
| Components | lb-mole/hr | mole % | | lb-mole/hr | mole % | | lb-mole/hr | mole % | | lb-mole/hr | mole % | | lb-mole/hr | mole % | | lb-mole/hr | mole % | | lb-mole/hr | mole % | |
| Hydrogen | 0.00 | 0.00 | | 0.00 | 0.00 | | 0.26 | 13.67 | | 0.92 | 92.45 | | 0.00 | 0.09 | | 0.00 | 0.21 | | 0.00 | 0.00 | |
| Methane | 1.60 | 93.80 | | 0.00 | 0.00 | | 0.00 | 0.00 | | 0.02 | 2.21 | | 0.00 | 0.05 | | 0.00 | 0.00 | | 0.00 | 0.00 | |
| Carbon Monoxide | 0.00 | 0.00 | | 0.00 | 0.00 | | 0.11 | 5.81 | | 0.00 | 0.00 | | 0.00 | 0.05 | | 0.00 | 0.11 | | 0.00 | 0.00 | |
| Carbon Dioxide | 0.02 | 1.10 | | 0.00 | 0.00 | | 0.54 | 28.35 | | 0.00 | 0.00 | | 1.75 | 44.77 | | 1.75 | 99.02 | | 0.03 | 0.08 | |
| Water | 0.00 | 0.00 | | 0.36 | 1.01 | | 0.99 | 51.81 | | 0.05 | 4.66 | | 2.15 | 54.79 | | 0.00 | 0.00 | | 0.41 | 1.26 | |
| Nitrogen | 0.02 | 1.10 | | 27.90 | 78.25 | | 0.01 | 0.36 | | 0.01 | 0.69 | | 0.01 | 0.30 | | 0.01 | 0.66 | | 27.90 | 85.25 | |
| Oxygen | 0.00 | 0.00 | | 7.40 | 20.74 | | 0.00 | 0.00 | | 0.00 | 0.00 | | 0.00 | 0.00 | | 0.00 | 0.00 | | 4.39 | 13.40 | |
| Ethylene | 0.00 | 0.00 | | 0.00 | 0.00 | | 0.00 | 0.00 | | 0.00 | 0.00 | | 0.00 | 0.00 | | 0.00 | 0.00 | | 0.00 | 0.00 | |
| Ethane+ | 0.07 | 4.00 | | 0.00 | 0.00 | | 0.00 | 0.00 | | 0.00 | 0.00 | | 0.00 | 0.00 | | 0.00 | 0.00 | | 0.00 | 0.00 | |
| Total | 1.71 | 100.00 | | 35.66 | 100.00 | | 1.92 | 100.00 | | 1.00 | 100.00 | | 3.92 | 100.00 | | 1.77 | 100.00 | | 32.73 | 100.00 | |

FIG. 3

SYSTEM FOR CAPTURING CO2 FROM A FUEL CELL

CROSS-REFERENCE TO RELATED APPLICATIONS

This application is a Continuation of International Patent Application No. PCT/US2016/062069, filed Nov. 15, 2016, which claims the benefit of priority to U.S. Patent Application No. 62/255,835, filed Nov. 16, 2015. The entire disclosures of International Patent Application No. PCT/US2016/062069 and U.S. Patent Application No. 62/255,835 are incorporated by reference herein.

STATEMENT OF GOVERNMENT RIGHTS

This invention was made with Government support under Cooperative Agreement DE-EE0006669 awarded by the United States Department of Energy. The Government has certain rights in the invention.

BACKGROUND

The present disclosure relates to fuel cell systems for the production of electricity. In particular, the present disclosure relates to a fuel cell system capable of capturing $CO_2$ from a fuel cell.

Fuel cells are devices that are capable of converting chemical energy stored in a fuel, such as a hydrocarbon fuel, into electrical energy through electrochemical reactions. In general, a fuel cell comprises an anode, an electrolyte layer, and a cathode. The electrolyte layer serves to transfer ions between the anode and the cathode, which facilitate reactions within the anode and the cathode to generate electrons for the production of electricity.

Fuel cells are often characterized by the type of electrolyte layer used for the transfer of specific ions. For example, one type of fuel cell is the solid oxide fuel cell (SOFC), which incorporates a solid ceramic electrolyte for the transfer of negatively charged oxygen ions from the cathode to the anode.

During operation of an SOFC, air is supplied to the cathode where oxygen gas reacts with electrons to form negatively charged oxygen ions, which are transferred to the anode through the electrolyte layer. At the same time, a hydrocarbon fuel, such as natural gas, is mixed with steam in a reforming process where methane and water react to produce hydrogen gas and carbon dioxide. The hydrogen gas and carbon dioxide react with the oxygen ions transferred by the electrolyte layer, producing the electrons for electricity and completing the electrical circuit. As a byproduct of this reaction, water, carbon dioxide, and residual hydrogen gas are released as an exhaust from the anode. Part of the anode exhaust is typically recycled to the anode, but the remainder is exported to prevent excessive buildup of carbon dioxide.

Carbon dioxide, however, is considered to be a harmful emission due to its effect on climate change. Thus, in order to avoid the release of carbon dioxide into the environment, it is preferable to capture the $CO_2$ from the anode exhaust and store the $CO_2$ for other, more environmentally-friendly purposes, such as underground storage or oil production needs. One method to capture carbon dioxide from the anode exhaust of an SOFC is through the use of an anode gas oxidizer, which is fed pure oxygen instead of air, avoiding dilution of the $CO_2$ with $N_2$. An anode gas oxidizer uses oxygen gas to oxidize the anode exhaust in order to capture the heating value contained within the exported anode exhaust. However, the pure oxygen needed for this process can be expensive to produce. Currently, methods in generating pure oxygen for use in an anode gas oxidizer are limited to the use of an air separation unit, which separates oxygen from air to supply the oxygen needed. However, such a system is costly and inefficient. Thus, it would be advantageous to provide an efficient and cost-effective system that can provide the oxygen necessary to facilitate the capture of $CO_2$ in the exported anode exhaust.

SUMMARY

In certain embodiments, a carbon dioxide capture system for removing carbon dioxide from an exhaust stream may include a fuel cell configured to produce a first exhaust stream comprising carbon dioxide and water, and a molten carbonate electrolyzer cell configured to receive a portion of the first exhaust stream and output a second exhaust stream comprising oxygen and carbon dioxide and a third exhaust stream of relatively pure hydrogen.

In one aspect, which is combinable with the above embodiment, the carbon dioxide capture system further includes a gas oxidizer configured to receive the first exhaust stream and the second exhaust stream and output a stream comprising water and carbon dioxide.

In one aspect, which is combinable with any of the above embodiments and aspects, the fuel cell may be a solid oxide fuel cell.

In one aspect, which is combinable with any of the above embodiments and aspects, the first exhaust stream may further comprise hydrogen and carbon monoxide.

In one aspect, which is combinable with any of the above embodiments and aspects, the fuel cell is configured to internally reform a fuel supplied to the fuel cell to produce hydrogen.

In one aspect, which is combinable with any of the above embodiments and aspects, the electrolyzer cell is further configured to output a supply stream comprising a high purity (e.g., greater than 98% concentration) hydrogen gas.

In certain embodiments, a carbon dioxide capture system for removing carbon dioxide from an anode exhaust stream produced by a solid oxide fuel cell includes a solid oxide fuel cell having a first anode and a first cathode. The first anode is configured to receive a fuel and recycled anode exhaust and output an anode exhaust stream. The carbon dioxide capture system further includes an electrolyzer cell having a second anode and a second cathode. The second anode is configured to receive a portion of the anode exhaust stream. The second cathode is configured to output a first exhaust stream comprising oxygen and carbon dioxide.

In one aspect, which is combinable with any of the above embodiments, the carbon dioxide capture system further includes a gas oxidizer configured to receive a portion of the anode exhaust stream and the first exhaust stream outputted from the second cathode and output a oxidized stream comprising water and carbon dioxide.

In one aspect, which is combinable with any of the above embodiments and aspects, the first exhaust stream of the second cathode further comprises carbon dioxide and oxygen.

In one aspect, which is combinable with any of the above embodiments and aspects, the second anode is configured to output a supply stream comprising hydrogen.

In one aspect, which is combinable with any of the above embodiments and aspects, the electrolyzer cell is a molten carbonate electrolysis cell.

In one aspect, which is combinable with any of the above embodiments and aspects, the fuel cell receives a hydrocarbon fuel.

In one aspect, which is combinable with any of the above embodiments and aspects, the anode exhaust stream from the fuel cell comprises hydrogen, carbon monoxide, water, and carbon dioxide.

In certain embodiments, a method for capturing carbon dioxide from an exhaust stream produced by a fuel cell includes supplying the fuel cell with a fuel, producing a first exhaust stream comprising carbon dioxide, supplying a portion of the first exhaust stream to an electrolyzer cell, which may be a molten carbonate electrolyzer cell, and producing a second exhaust stream comprising carbon dioxide and oxygen.

In one aspect, which is combinable with any of the above embodiments and aspects, the method for capturing carbon dioxide further includes supplying the portion of the first exhaust stream and the second exhaust stream to a gas oxidizer, and outputting an oxidized stream comprising water and carbon dioxide.

In one aspect, which is combinable with any of the above embodiments and aspects, the method for capturing carbon dioxide further includes condensing the water from the stream comprising water and carbon dioxide.

In one aspect, which is combinable with any of the above embodiments and aspects, the method for capturing carbon dioxide further includes outputting a supply stream from the electrolyzer cell comprising high purity hydrogen.

In one aspect, which is combinable with any of the above embodiments and aspects, the portion of the anode exhaust from the fuel cell that is sent to the electrolyzer cell is controlled such that the amount of oxygen produced is approximately equal to the stoichiometric amount needed to convert the hydrogen, carbon monoxide, and methane in the portion of the anode exhaust sent to the anode gas oxidizer to carbon dioxide and water, minimizing the impurities in the carbon dioxide captured.

These and other advantageous features will become apparent to those reviewing the disclosure and drawings.

BRIEF DESCRIPTION OF THE DRAWINGS

FIG. 3 is a table showing components of gas streams within the $CO_2$ capture system of FIG. 1.

DETAILED DESCRIPTION

Referring generally to the figures, disclosed herein is a $CO_2$ capture system for capturing highly purified $CO_2$ from an anode exhaust stream produced by a fuel cell that is both less costly and highly efficient in terms of energy production.

Figure 1:
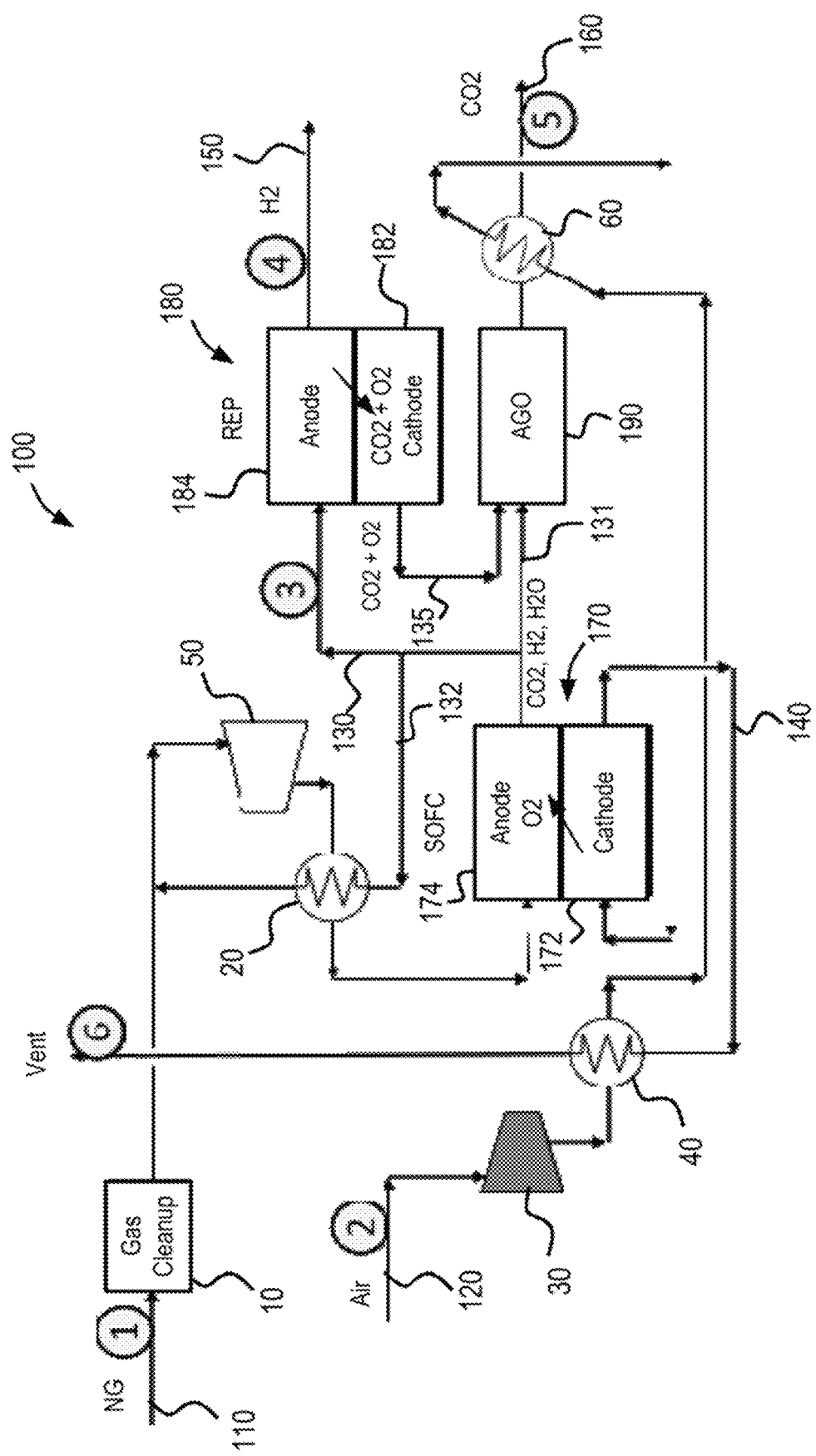
FIG. 1 shows a schematic view of a $CO_2$ capture system for a solid oxide fuel cell, according to one embodiment of the present invention.

FIG. 1 shows a $CO_2$ capture system 100 for removing carbon dioxide from an anode exhaust stream produced by a fuel cell. As shown in FIG. 1, a hydrocarbon fuel, such as natural gas, is supplied to the system 100 through a fuel supply line 110. The fuel stream is first directed through a gas cleanup station 10, which removes impurities contained in the fuel stream that may be harmful to the fuel cell. The cleaned fuel stream is then mixed with an anode exhaust recycle stream (third portion of a first exhaust stream) from an anode 174 of a fuel cell 170, which is supplied by a return line 132 and will be described in more detail below. This recycle stream provides water to the fuel to prevent carbon formation and also increases the fuel-cell efficiency. In the embodiment shown in FIG. 1, the fuel cell 170 is configured as a solid oxide fuel cell (SOFC). The fuel cell 170 may be capable of internally reforming the mixed fuel stream by converting methane and water to hydrogen and carbon dioxide. Alternatively, the system 100 may incorporate an external reformer to reform the mixed fuel stream before being introduced into the fuel cell 170. In addition, the fuel cell 170 may comprise a plurality of unit cells connected to form a fuel cell stack.

The mixed fuel stream, containing the hydrocarbon fuel and anode exhaust, is directed through the fuel supply line 110 by a first blower 50, where, after being heated by a first heat exchanger 20, the mixed fuel stream is supplied to the anode 174 of the SOFC 170 to facilitate the electrochemical reactions needed for the production of electricity.

As further shown in FIG. 1, an air stream is supplied to the system 100 through an air supply line 120, where it is directed by a second blower 30 through a second heat exchanger 40. The air stream is heated by the second heat exchanger 40 and continues through the air supply line 120 to a third heat exchanger 60 to be heated further. After passing through the third heat exchanger 60, the air supply line 120 supplies the hot air stream to a cathode 172 of the SOFC 170. As described above, the mixed fuel stream supplied to the anode 174 and the air stream supplied to the cathode 172 facilitate internal reactions that result in the transfer of negatively charged oxygen ions across the solid oxide electrolyte layer of the SOFC 170 such that electricity may be produced. After completion of the reactions, the cathode 172 outputs a cathode exhaust stream containing oxygen-depleted air, which is vented out of the system 100 via a cathode exhaust line 140. Waste heat from the cathode exhaust stream is used by the second heat exchanger 40 to warm the air stream 120 that will be supplied to the cathode 172.

At the anode 174, an anode exhaust stream (first exhaust stream) is produced. The anode exhaust stream largely contains carbon dioxide, water, and unreacted hydrogen gas, which is carried from the solid oxide fuel cell 174 and split into two streams that flow through a reformer-electrolyzer-purifier (REP) supply line 130 (first portion of the first exhaust stream) and an anode gas oxidizer (AGO) supply line 131 (second portion of the first exhaust stream). As further shown in FIG. 1, at least a portion of the anode exhaust stream (third portion of the first exhaust stream) flows through the return line 132 to be mixed with the fuel stream supplied by the fuel supply line 110. The flow ratio of the anode exhaust stream to the REP supply line 130 and the anode exhaust stream to the AGO supply line 131 is controlled so that the amount of H2 and O2 in the exhaust gas from the AGO 190 (described below) is minimized. For example, in certain embodiments, the portion of the anode exhaust stream supplied to the REP supply line 130 is controlled such that the amount of oxygen produced in the exhaust stream (second exhaust stream) outputted by the REP 180 is approximately equal, or equal to, the stoichiometric amount needed to convert the hydrogen, carbon monoxide, and methane present in the portion of the anode exhaust stream supplied to the AGO supply line 131 to carbon dioxide and water, minimizing the impurities present in the carbon dioxide captured in the exhaust gas from the AGO 190 (third exhaust stream). In addition, although not shown in FIG. 1, in some embodiments, additional methane is burned in a separate oxidizer with air in order to achieve improved heat balance in the overall system.

Figure 2:
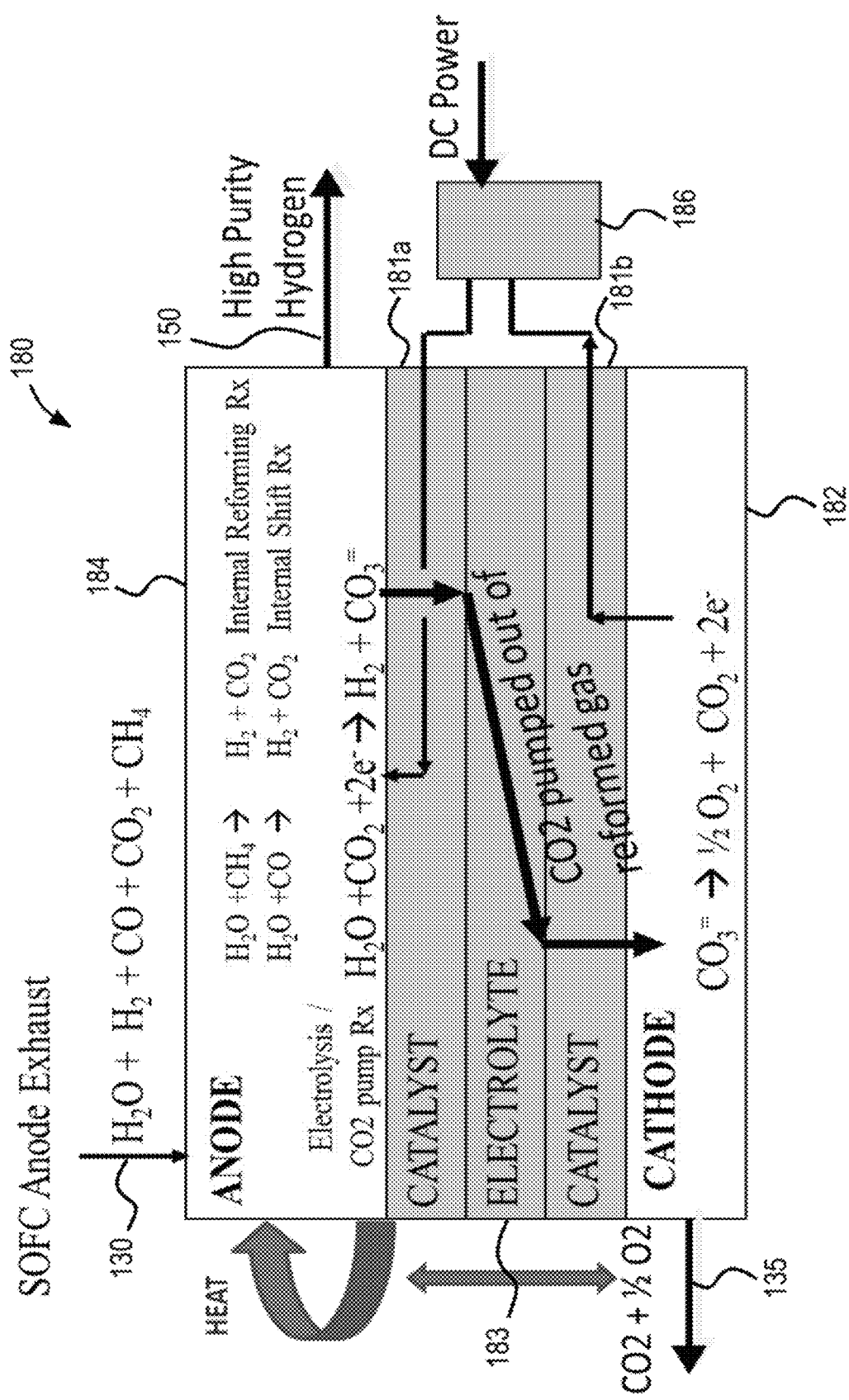
FIG. 2 shows a detailed, schematic view of a reformer-electrolyzer-purifier used in the $CO_2$ capture system of FIG. 1.

FIG. 2 shows a detailed, schematic view of the REP 180. The REP 180 is capable of internally reforming and purifying hydrogen from fuel, which can later be used for the production of electricity. An example of an REP system is described in greater detail in International Patent Application No. PCT/US2015/013837, which is incorporated by reference herein in its entirety. In the embodiment shown in FIG. 2, the REP 180 is configured as an electrolyzer cell, such as a molten carbonate electrolysis cell (MCEC). The REP 180 may comprise a plurality of individual cells to form an REP stack. As shown in FIG. 2, the REP 180 generally comprises the anode 184, which includes a catalyst layer 181a, an electrolyte layer 183, the cathode 182, which includes a catalyst layer 181b, and a power supply 186 configured to apply a voltage to the anode 184 and cathode 182.

The anode exhaust stream from the SOFC 170 is supplied to the anode 184 through the anode exhaust line 130. The anode exhaust stream largely contains water, hydrogen gas, carbon dioxide, and small amounts of carbon monoxide and methane. In some embodiments, a small amount of additional methane (not shown) is added to the exhaust stream supplied to the REP 180 to obtain the desired heat balance in the system. During an internal reforming reaction driven by the catalyst layer 181a, water reacts with methane to produce hydrogen and carbon dioxide. Because the methane contained in the anode exhaust stream is present in residual amounts due to the reforming reaction that occurred in the SOFC 170, minimal reforming of the anode exhaust stream is required. In addition, during an internal gas-shift reaction, water reacts with carbon monoxide to produce additional hydrogen and carbon dioxide.

As further shown in FIG. 2, during an electrolysis/$CO_2$ pump reaction, water, carbon dioxide, and electrons supplied by the power supply 186 react to produce hydrogen, carbonate ions $CO_3^=$, and residual heat. The residual heat facilitates the internal reforming and gas-shift reactions described above. The hydrogen produced by the reactions in the anode 184 is purified by the transfer of almost all of the carbon from the gas as carbonate ions flowing to the cathode 182 across the electrolyte layer 183. The high purity hydrogen gas is removed as a hydrogen supply stream (fourth exhaust stream) from the REP 180 through a hydrogen supply line 150, which may then be recycled back to the SOFC 170 to reduce fuel needs for energy production or exported and stored as a separate product stream. In some embodiments, the anode exhaust stream comprises at least 90% hydrogen. In certain embodiments, the anode exhaust stream comprises at least 98% hydrogen.

As noted above, the carbonate ions produced by the electrolysis/$CO_2$ pump reaction are transferred from the anode 184 to the cathode 182 via the electrolyte layer 183. At the cathode 182, the carbonate ions separate to produce oxygen, carbon dioxide, and electrons. These electrons complete the circuit with the power supply 186 and return to the anode 184. The oxygen and carbon dioxide produced from the carbonate ions are removed from the REP 180 through an REP cathode exhaust line 135. Thus, the transfer of the carbonate ions together with the subsequent reaction at the cathode 182 has the effect of pumping carbon dioxide together with pure oxygen gas out of the anode exhaust stream.

As shown in FIG. 1, the REP cathode exhaust line 135 carries the REP exhaust stream containing oxygen and carbon dioxide to an AGO 190. In addition, as described above, a portion of the anode exhaust stream from the SOFC 170, containing carbon dioxide, hydrogen, and water, is also supplied to the AGO 190 via the AGO supply line 131. Here, the oxygen contained within the REP cathode exhaust stream facilitates the oxidation of the anode exhaust stream such that carbon dioxide, along with water, may be removed from the system 100 via a removal line 160 in the form of an AGO exhaust stream. As the AGO exhaust stream is removed, it is first cooled by the third exchanger 60 and subjected to additional cooling (not shown) so that water may be condensed out of the AGO exhaust stream and carbon dioxide in a highly purified concentration can be obtained for storage purposes. In some embodiments, carbon dioxide may be removed in concentrations of at least 95%.

FIG. 3 is a table showing the compositions of the various gas streams present in the carbon dioxide capture system 100, according to one embodiment of the present invention. Each column 1-6 corresponds to the composition of the gas stream present at points 1-6 shown in FIG. 1. As shown in column 1, the hydrocarbon fuel supplied to the SOFC 170 contains mainly methane, with residual amounts of carbon dioxide and water. After producing electrical energy in the SOFC 170, the anode exhaust stream to the REP 180 now contains a much larger amount of carbon dioxide, along with water and hydrogen, as shown in column 3. As shown in column 4 of the table, hydrogen is capable of being extracted at over 90 mole percent purity due to the reactions within the REP 180, providing highly useful feed supplies for the SOFC 170 or additional external energy systems. As shown in column 5, the exhaust from the AGO 190 contains a higher concentration of carbon dioxide (e.g., at least 44 mole percent), compared to the anode exhaust stream fed to the REP 180, together with water and trace amounts of nitrogen. At this point, water may be easily condensed out of the AGO exhaust stream to produce dry carbon dioxide in a highly purified form of about 99 mole percent, as shown in column 5a. In addition, as shown in column 6, the exhaust vented out of the system 100 from the cathode 172 of the SOFC 170 contains mostly nitrogen gas and a minimal amount of carbon dioxide (e.g., less than 1 mole percent).

The $CO_2$ capture system described herein provides a highly efficient and cost-effective method for removing carbon dioxide from an anode exhaust stream produced by a fuel cell, in particular a solid oxide fuel cell. By incorporating an electrolyzer cell in the form of an REP, a stream containing carbon dioxide and oxygen gas necessary to facilitate the removal of pure carbon dioxide from the anode exhaust stream can be produced. In addition, as a byproduct of this process, a valuable, exportable high purity hydrogen stream is produced, increasing the energy output of the system as a whole, thereby offsetting most of the energy needed to drive the removal system. Thus, a fuel cell system may be provided where clean, reliable energy is supplied and harmful $CO_2$ emissions are minimized.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention. For example, the heat recovery heat exchangers may be further optimized.

What is claimed is:

1. A carbon dioxide capture system for capturing carbon dioxide from an exhaust stream comprising:
   a fuel cell configured to output a first exhaust stream comprising carbon dioxide and water;
   an electrolyzer cell comprising an anode and a cathode, wherein the anode of the electrolyzer cell is configured to receive a first portion of the first exhaust stream, and the cathode of the electrolyzer cell is configured to output a second exhaust stream comprising oxygen and carbon dioxide; and
   a gas oxidizer configured to receive a second portion of the first exhaust stream and the second exhaust stream from the cathode of the electrolyzer cell, and output a third exhaust stream comprising water and carbon dioxide.

2. The system according to claim 1, wherein the fuel cell is a solid oxide fuel cell.

3. The system according to claim 1, wherein the electrolyzer cell is a molten carbonate electrolysis cell.

4. The system according to claim 1, wherein the first exhaust stream further comprises hydrogen and carbon monoxide.

5. The system according to claim 1, wherein the fuel cell is configured to internally reform a fuel supplied to the fuel cell to produce hydrogen.

6. The system according to claim 1, wherein the electrolyzer cell is further configured to output a fourth exhaust stream comprising a high purity hydrogen gas.

7. The system according to claim 6, wherein the fourth exhaust stream comprises at least 90% hydrogen gas.

8. The system according to claim 1, wherein the fuel cell comprises an anode and a cathode, and wherein the anode of the fuel cell is configured to receive a fuel and output the first exhaust stream.

9. The system according to claim 8, wherein the anode of the fuel cell is further configured to receive a third portion of the first exhaust stream.

10. The system according to claim 8, wherein the fuel is natural gas.

11. The system according to claim 8, wherein the cathode of the fuel cell is configured to receive an air stream.

12. The system according to claim 6, wherein the anode of the electrolyzer cell is further configured to output the fourth exhaust stream.

13. The system according to claim 1, wherein the first portion of the first exhaust stream supplied to the electrolyzer cell is in an amount such that the oxygen present in the second exhaust stream is approximately equal to the stoichiometric amount needed to convert hydrogen, carbon monoxide, and methane present in the second portion of the first exhaust stream to carbon dioxide and water present in the third exhaust stream.

* * * * *